(12) United States Patent
Lee et al.

(10) Patent No.: US 11,374,702 B2
(45) Date of Patent: Jun. 28, 2022

(54) METHOD FOR SEMI-PERSISTENT SCHEDULING TRANSMISSION USING HARQ PROCESS IDENTIFIERS IN WIRELESS COMMUNICATION SYSTEM AND A DEVICE THEREFOR

(71) Applicant: LG ELECTRONICS INC., Seoul (KR)

(72) Inventors: Jeonggu Lee, Seoul (KR); Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 109 days.

(21) Appl. No.: 16/763,484

(22) PCT Filed: Oct. 31, 2018

(86) PCT No.: PCT/KR2018/013066
§ 371 (c)(1),
(2) Date: May 12, 2020

(87) PCT Pub. No.: WO2019/098574
PCT Pub. Date: May 23, 2019

(65) Prior Publication Data
US 2020/0304250 A1 Sep. 24, 2020

Related U.S. Application Data

(60) Provisional application No. 62/587,459, filed on Nov. 16, 2017.

(51) Int. Cl.
*H04L 1/18* (2006.01)
*H04W 72/04* (2009.01)

(52) U.S. Cl.
CPC .......... *H04L 1/1864* (2013.01); *H04W 72/04* (2013.01)

(58) Field of Classification Search
CPC ... H04L 1/1864; H04L 1/1812; H04L 1/1822; H04L 1/1887; H04W 72/04; H04W 72/042; H04W 72/14
See application file for complete search history.

(56) References Cited

U.S. PATENT DOCUMENTS

2017/0303317 A1   10/2017  Islam et al.
2018/0092122 A1*   3/2018  Babaei ................ H04W 72/14
2019/0230691 A1*   7/2019  Cao .................... H04W 72/1268

OTHER PUBLICATIONS

Ericsson, "On UL Transmission without UL Grant," 3GPP TSG-RAN WG1 #90, R1-1714435, Aug. 2017, 6 pages.

(Continued)

*Primary Examiner* — Ian N Moore
*Assistant Examiner* — Rushil Parimal Sampat
(74) *Attorney, Agent, or Firm* — Lee Hong Degerman Kang Waimey (57) ABSTRACT

The present application relates to a wireless communication system. More specifically, the present application relates to a method and a device for semi-persistent scheduling transmission using HARQ process IDs. Specifically, a sequential order in a HARQ process ID set is used. The communication device is capable of communicating with at least one of another device, a device related to an autonomous driving vehicle, a base station or a network.

5 Claims, 8 Drawing Sheets

(56) References Cited

OTHER PUBLICATIONS

Nokia, "HARQ for autonomous uplink access," 3GPP TSG-RAN WG1 #90bis, R1-1717241, Sep. 2017, 4 pages.
Ericsson, "On UL Data Transmission Procedure," 3GPP TSG-RAN WG1 #90bis, R1-1718647, Oct. 2017, 10 pages.
Nokia, "Proposal to progress Autonomous uplink access," 3GPP TSG-RAN WG2 #99, R1-1709880, Aug. 2017, 4 pages.
PCT International Application No. PCT/KR2018/013066, International Search Report dated Feb. 21, 2019, 9 pages.

* cited by examiner

(a) Control-Plane Protocol Stack (b) User-Plane Protocol Stack

(a) Control-Plane Protocol Stack (b) User-Plane Protocol Stack

METHOD FOR SEMI-PERSISTENT SCHEDULING TRANSMISSION USING HARQ PROCESS IDENTIFIERS IN WIRELESS COMMUNICATION SYSTEM AND A DEVICE THEREFOR

CROSS-REFERENCE TO RELATED APPLICATIONS

This application is the National Stage filing under 35 U.S.C. 371 of International Application No. PCT/KR2018/013066, filed on Oct. 31, 2018, which claims the benefit of U.S. Provisional Application No. 62/587,459, filed on Nov. 16, 2017, the contents of which are all hereby incorporated by reference herein in their entirety.

TECHNICAL FIELD

The present invention relates to a wireless communication system and, more particularly, to a method for handling of HARQ process IDs with uplink skipping in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

Figure 1:
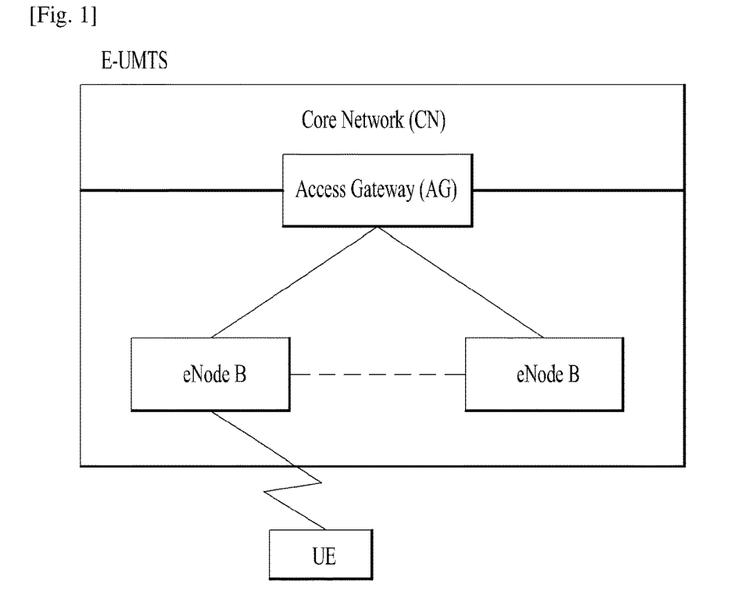
FIG. 1 is a diagram showing a network structure of an Evolved Universal Mobile Telecommunications System (E-UMTS) as an example of a wireless communication system.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication (NR, New Radio). In addition, a communication system design considering a service/UE sensitive to reliability and latency is being discussed. The introduction of next-generation RAT, which takes into account such Enhanced Mobile BroadBand (eMBB) transmission, and ultra-reliable and low latency communication (URLLC) transmission, is being discussed.

DISCLOSURE

Technical Problem

An object of the present invention devised to solve the problem lies in a method and device for handling of HARQ process IDs with uplink skipping in wireless communication system.

In R15 LR scope, skipping uplink transmission has been introduced, where the UE can skip uplink transmission on a TTI if there is no data to transmit even though there is UL resource on the TTI.

In LTE, Semi-Persistent Scheduling (SPS) in asynchronous HARQ has been introduced for MTC/NB-IoT. However, it has not considered skipping uplink transmission. Accordingly, if a TTI is associated with a HARQ process ID, it means that there is uplink resource for that TTI and the UE transmits in uplink, i.e., the UE does not skip uplink transmission. On the other hand, if a TTI is not associated with a HARQ process ID, it means that there is no uplink resource for that TTI, and hence, the UE doesn't transmit in uplink.

In NR, SPS is to be always used in asynchronous HARQ with skipping uplink transmission. As a result, we now have a case where there is uplink resource for a TTI but the UE doesn't transmit in uplink, i.e., the UE skips uplink transmission.

If UL skipping is used in asynchronous HARQ, there is a problem that the network cannot distinguish whether the network doesn't successfully receive the UL data or the UE skips UL transmission. The reason is that a HARQ process ID is pre-defined on a TTI where there is UL resource, i.e., SPS.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

According to our invention, the UE treats a TTI where the UE skips uplink transmission as if there is no uplink resource for that TTI. Accordingly, the UE does not associate HARQ process ID to the TTI if the UE skips uplink transmission. In other words, the HARQ process ID is associated to a TTI only when the UE actually transmits in uplink. Given that HARQ process ID for SPS transmission would be sequentially increased, if the network is able to know the HARQ process ID used for uplink transmission, the network would easily differentiate failure and skipping because missing HARQ process ID always means failure.

This invention would be better from DTX error performance point of view because the network can explicitly know which HARQ process transmission fails. Thus, the network can detects a missing HARQ process ID, the network considers that the UL data transmitted on the missing HARQ process ID is failed, and network can provide UL grant for retransmission on the missing HARQ process ID.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 2A:
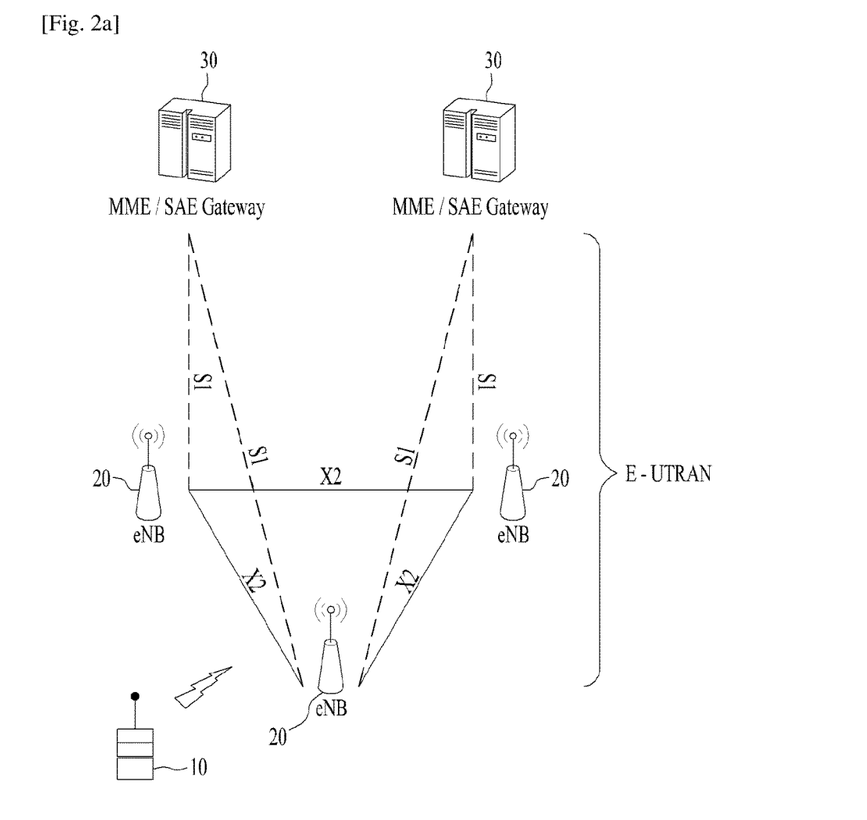
FIG. 2a is a block diagram illustrating network structure of an evolved universal mobile telecommunication system (E-UMTS)

FIG. 2a is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2a, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
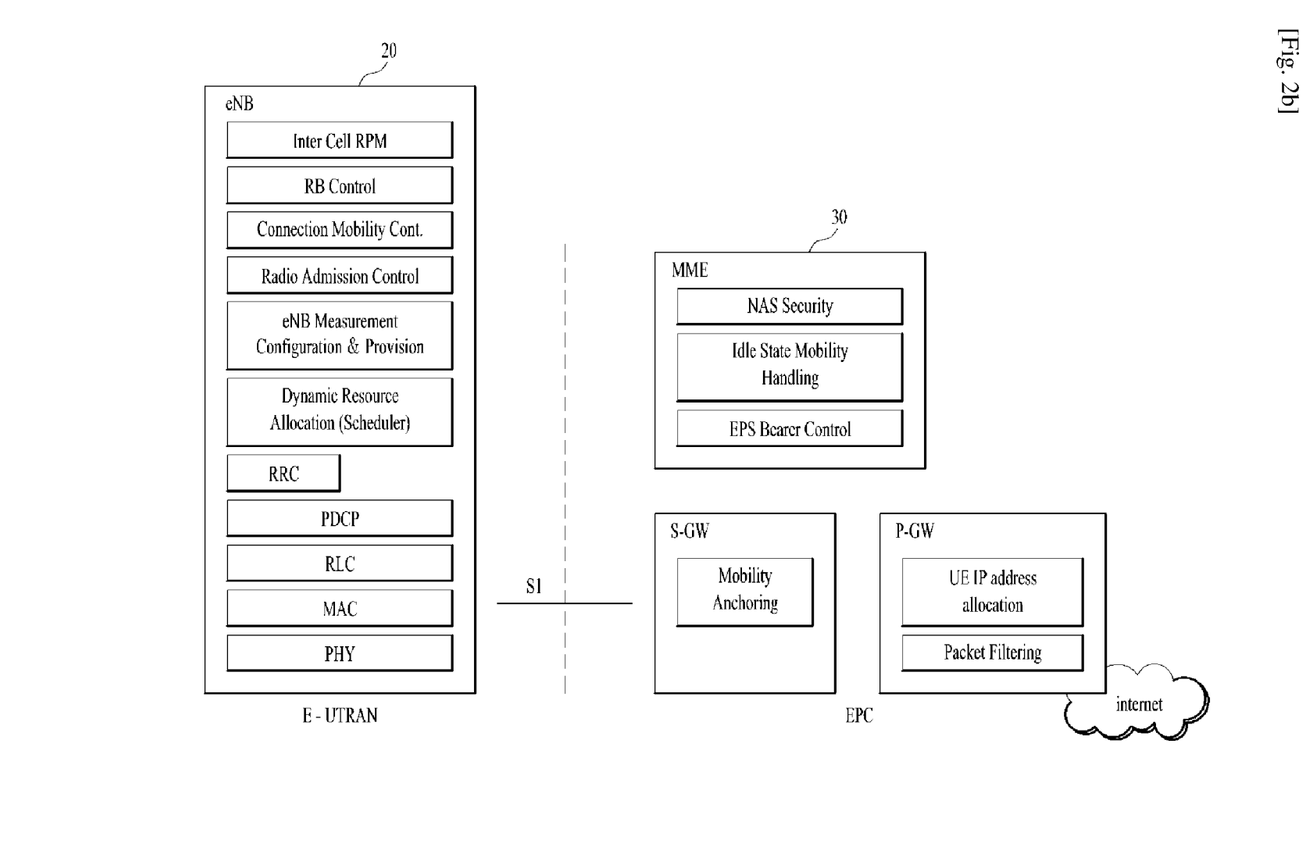
FIG. 2b is a block diagram depicting architecture of a typical E-UTRAN and a typical EPC.

FIG. 2b is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
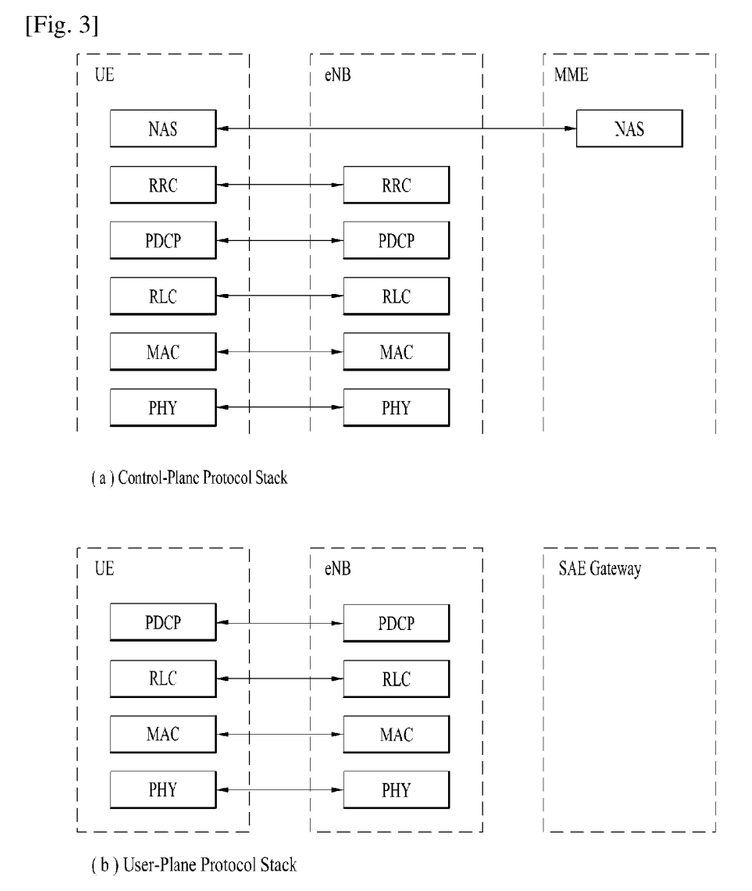
FIG. 3 is a diagram showing a control plane and a user plane of a radio interface protocol between a UE and an E-UTRAN based on a 3rd generation partnership project (3GPP) radio access network standard.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4A:
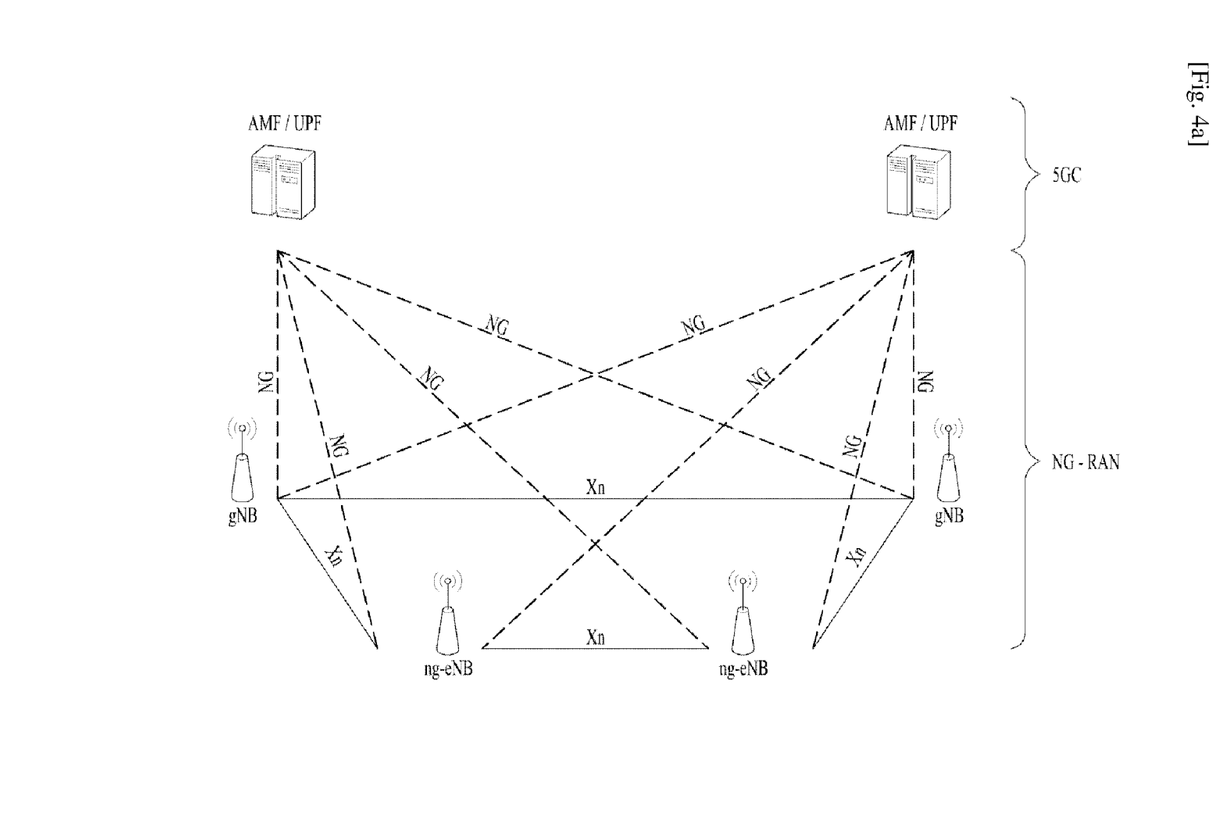
FIG. 4a is a block diagram illustrating network structure of NG Radio Access Network (NG-RAN) architecture.
Figure 4B:
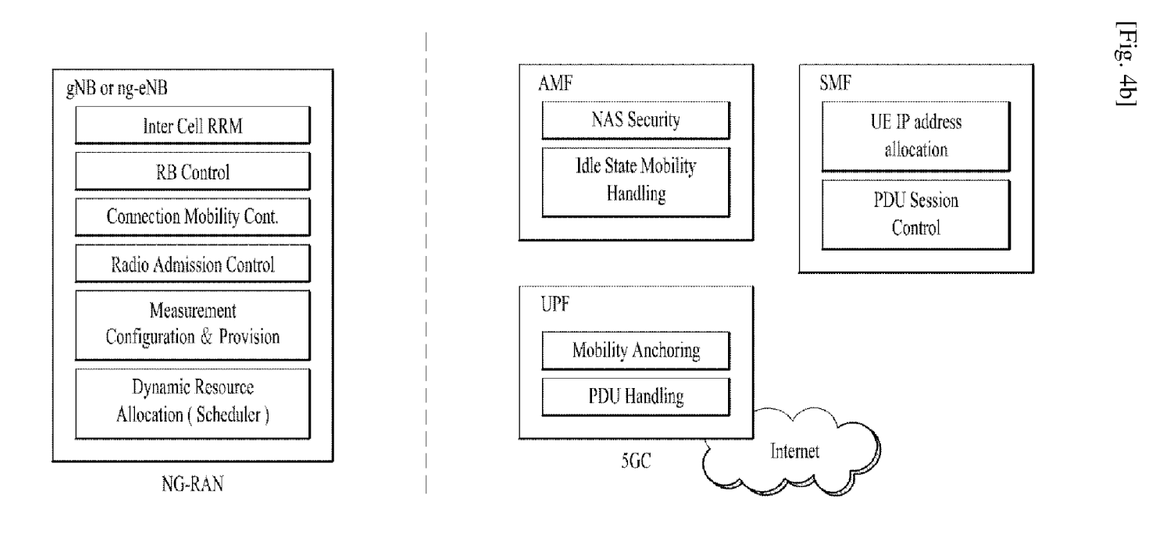
FIG. 4b is a block diagram depicting architecture of functional Split between NG-RAN and 5G Core Network (5GC)

FIG. 4*a* is a block diagram illustrating network structure of NG Radio Access Network (NG-RAN) architecture, and FIG. 4*b* is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

Figure 5:
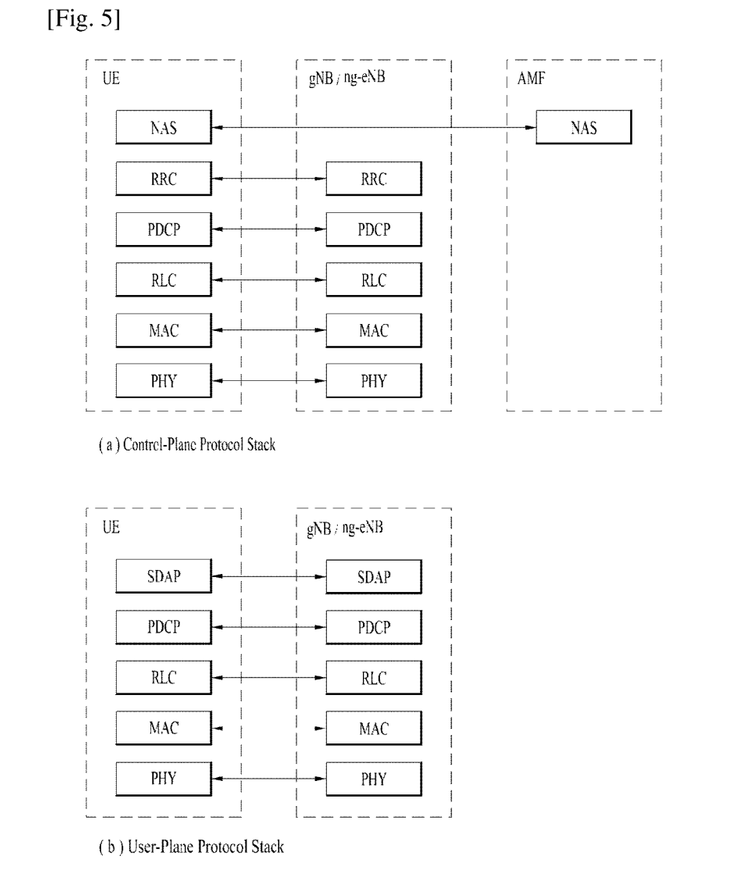
FIG. 5 is a diagram showing a control plane and a user plane of a radio interface protocol between a UE and a NG-RAN based on a 3rd generation partnership project (3GPP) radio access network standard.

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

Figure 6:
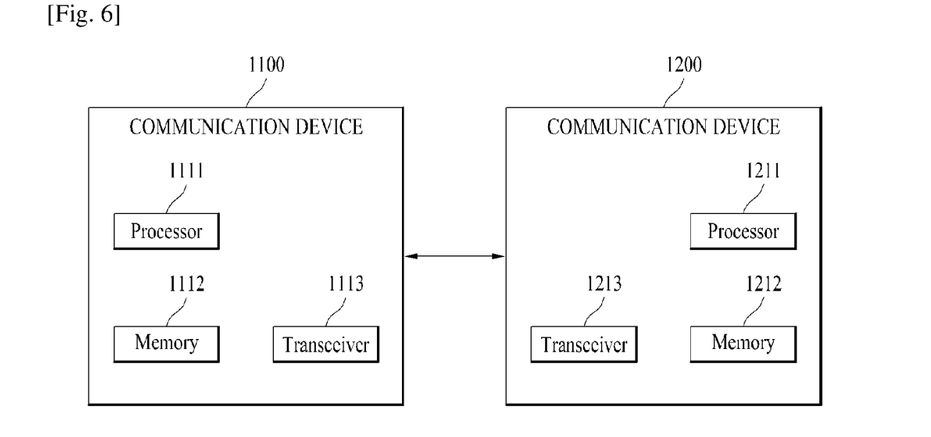
FIG. 6 is a block diagram of a communication apparatus according to an embodiment of the present invention.

FIG. 6 is a block diagram of communication devices according to an embodiment of the present invention.

The apparatus shown in FIG. 6 can be a user equipment (UE) and/or eNB or gNB adapted to perform the above mechanism, but it can be any device for performing the same operation.

As shown in FIG. 6, one of the communication device 1100 and the communication device 1200 may be a user equipment (UE) and the other one mat be a base station. Alternatively, one of the communication device 1100 and the communication device 1200 may be a UE and the other one may be another UE. Alternatively, one of the communication device 1100 and the communication device 1200 may be a network node and the other one may be another network node. In the present disclosure, the network node may be a base station (BS). In some scenarios, the network node may be a core network device (e.g. a network device with a mobility management function, a network device with a session management function, and etc.).

In some scenarios of the present disclosure, either one of the communication devices 1100, 1200, or each of the communication devices 1100, 1200 may be wireless communication device(s) configured to transmit/receive radio signals to/from an external device, or equipped with a wireless communication module to transmit/receive radio signals to/from an external device. The wireless communication module may be a transceiver. The wireless communication device is not limited to a UE or a BS, and the wireless communication device may be any suitable mobile computing device that is configured to implement one or more implementations of the present disclosure, such as a vehicular communication system or device, a wearable device, a laptop, a smartphone, and so on. A communication device which is mentioned as a UE or BS in the present disclosure may be replaced by any wireless communication device such as a vehicular communication system or device, a wearable device, a laptop, a smartphone, and so on.

In the present disclosure, communication devices 1100, 1200 include processors 1111, 1211 and memories 1112, 1212. The communication devices 1100 may further include transceivers 1113, 1213 or configured to be operatively connected to transceivers 1113, 1213.

The processor 1111 and/or 1211 implements functions, procedures, and/or methods disclosed in the present disclosure. One or more protocols may be implemented by the processor 1111 and/or 1211. For example, the processor 1111 and/or 1211 may implement one or more layers (e.g., functional layers). The processor 1111 and/or 1211 may generate protocol data units (PDUs) and/or service data units (SDUs) according to functions, procedures, and/or methods disclosed in the present disclosure. The processor 1111 and/or 1211 may generate messages or information according to functions, procedures, and/or methods disclosed in the present disclosure. The processor 1111 and/or 1211 may generate signals (e.g. baseband signals) containing PDUs, SDUs, messages or information according to functions, procedures, and/or methods disclosed in the present disclosure and provide the signals to the transceiver 1113 and/or 1213 connected thereto. The processor 1111 and/or 1211 may receive signals (e.g. baseband signals) from the transceiver 1113 and/or 1213 connected thereto and obtain PDUs, SDUs, messages or information according to functions, procedures, and/or methods disclosed in the present disclosure.

The memory of 1112 and/or 1212 is connected to the processor of the network node and stores various types of PDUs, SDUs, messages, information and/or instructions. The memory 1112 and/or 1212 may be arranged inside or outside the processor 1111 and/or 1211, respectively, and may be connected the processor 1111 and/or 1211, respectively, through various techniques, such as wired or wireless connections.

The transceiver 1113 and/or 1213 is connected to the processor 1111 and/or 1211, respectively, and may be controlled by the processor 1111 and/or 1211, respectively, to transmit and/or receive a signal to/from an external device. The processor 1111 and/or 1211 may control transceiver 1113 and/or 1213, respectively, to initiate communication and to transmit or receive signals including various types of information or data which are transmitted or received through a wired interface or wireless interface. The transceivers 1113, 1213 include a receiver to receive signals from an external device and transmit signals to an external device.

In a wireless communication device such as a UE or BS, an antenna facilitates the transmission and reception of radio signals (i.e. wireless signals). In the wireless communication device, the transceiver 1113 or 1213 transmits and/or receives a wireless signal such as a radio frequency (RF) signal. For a communication device which is a wireless communication device (e.g. BS or UE), the transceiver 1113 or 1213 may be referred to as a radio frequency (RF) unit. In some implementations, the transceiver 1113 and/or 1213 may forward and convert baseband signals provided by the processor 1111 and/or 1211 connected thereto into radio signals with a radio frequency. In the wireless communication device, the transceiver 1113 or 1213 may transmit or receive radio signals containing PDUs, SDUs, messages or information according to functions, procedures, and/or methods disclosed in the present disclosure via a radio interface (e.g. time/frequency resources). In some implementations, upon receiving radio signals with a radio frequency from another communication device, the transceiver 1113 and/or 1213 may forward and convert the radio signals to baseband signals for processing by the processor 1111 and/or 1211. The radio frequency may be referred to as a carrier frequency. In a UE, the processed signals may be processed according to various techniques, such as being transformed into audible or readable information to be output via a speaker of the UE.

In some scenarios of the present disclosure, functions, procedures, and/or methods disclosed in the present disclosure may be implemented by a processing chip. The processing chip may be a system on chip (SoC). The processing chip may include the processor 1111 or 1211 and the memory 1112 or 1212, and may be mounted on, installed on, or connected to the communication device 1100 or 1200. The processing chip may be configured to perform or control any one of the methods and/or processes described herein and/or to cause such methods and/or processes to be performed by a communication device which the processing chip is mounted on, installed on, or connected to. The memory 1112 or 1212 in the processing chip may be configured to store software codes including instructions that, when executed by the processor, causes the processor to perform some or all of functions, methods or processes discussed in the present disclosure. The memory 1112 or 1212 in the processing chip may store or buffer information or data generated by the processor of the processing chip or information recovered or obtained by the processor of the processing chip. One or more processes involving transmission or reception of the information or data may be performed by the processor 1111 or 1211 of the processing chip or under control of the processor 1111 or 1211 of the processing chip. For example, a transceiver 1113 or 1213 operably connected or coupled to the processing chip may transmit or receive signals containing the information or data under the control of the processor 1111 or 1211 of the processing chip.

For a communication device which is a wireless communication device (e.g. BS or UE), the communication device may include or be equipped with a single antenna or multiple antennas. The antenna may be configured to transmit and/or receive a wireless signal to/from another wireless communication device.

For a communication device which is a UE, the communication device may further include or be equipped with a power management module, an antenna, a battery, a display, a keypad, a Global Positioning System (GPS) chip, a sensor, a memory device, a Subscriber Identification Module (SIM) card (which may be optional), a speaker and/or a microphone. The UE may include or be equipped with a single antenna or multiple antennas. A user may enter various types of information (e.g., instructional information such as a telephone number), by various techniques, such as by pushing buttons of the keypad or by voice activation using the microphone. The processor of the UE receives and processes the user's information and performs the appropriate function (s), such as dialing the telephone number. In some scenarios, data (e.g., operational data) may be retrieved from the SIM card or the memory device to perform the function(s). In some scenarios, the processor of the UE may receive and process GPS information from a GPS chip to perform functions related to a position or a location of a UE, such as vehicle navigation, a map service, and so on. In some scenarios, the processor may display these various types of information and data on the display for the user's reference and convenience. In some implementations, a sensor may be coupled to the processor of the UE. The sensor may include one or more sensing devices configured to detect various types of information including, but not limited to, speed, acceleration, light, vibration, proximity, location, image and so on. The processor of the UE may receive and process sensor information obtained from the sensor and may perform various types of functions, such as collision avoidance, autonomous driving and so on. Various components (e.g., a camera, a Universal Serial Bus (USB) port, etc.) may be further included in the UE. For example, a camera may be further coupled to the processor of the UE and may be used for various services such as autonomous driving, a vehicle safety service and so on. In some scenarios, some components, e.g., a keypad, a Global Positioning System (GPS) chip, a sensor, a speaker and/or a microphone, may not be implemented in a UE.

Figure 7:
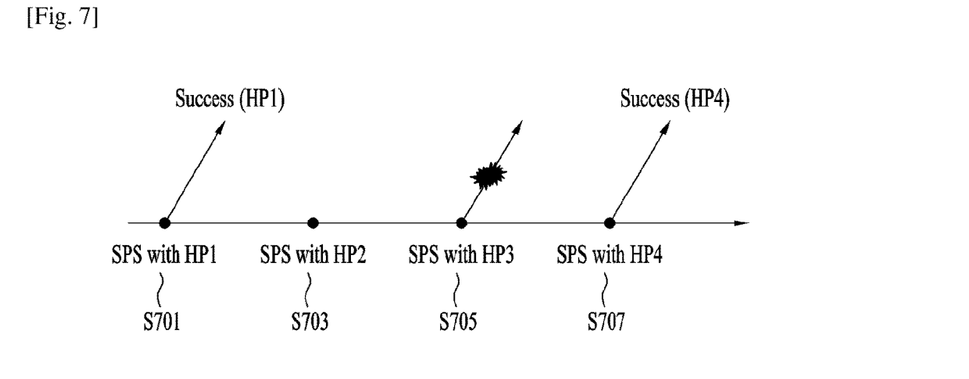
FIG. 7 is an example of the HARQ process ID handling with UL skipping.

FIG. 7 is an example of the HARQ process ID handling with UL skipping.

In LTE, SPS in asynchronous HARQ has been introduced for MTC. However, it has not considered skipping uplink transmission. Accordingly, if a TTI is associated with a HARQ process ID, it means that there is uplink resource for that TTI and the UE transmits in uplink, i.e., the UE does not skip uplink transmission. On the other hand, if a TTI is not associated with a HARQ process ID, it means that there is no uplink resource for that TTI, and hence, the UE doesn't transmit in uplink.

In NR, SPS is to be always used in asynchronous HARQ with skipping uplink transmission. As a result, we now have a case where there is uplink resource for a TTI but the UE doesn't transmit in uplink, i.e., the UE skips uplink transmission.

If UL skipping is used in asynchronous HARQ, there is a problem that the network cannot distinguish whether the network doesn't successfully receive the UL data or the UE skips UL transmission. The reason is that a HARQ process ID is pre-defined on a TTI where there is UL resource, i.e., SPS.

The problematic case with UL skipping is shown in FIG. 7.

On the 1st SPS, the UE transmits UL data on a HARQ process ID #1 (S701). The network successfully receives the UL data.

On the 2nd SPS, the UE skips UL data on a HARQ process ID #2 (S703). However, the network cannot clearly know whether the UE skips UL data or the network fails at receiving the UL data on the HARQ process ID #2 due to DTX error.

*85On the 3rd SPS, the UE transmits UL data on a HARQ process ID #3 (S705). However, the network cannot clearly know whether the UE skips UL data or the network fails at receiving the UL data on the HARQ process ID #3 due to DTX error.

On the 4th SPS, the UE transmits UL data on a HARQ process ID #4 (S707). The network successfully receives the UL data.

As the network considers that HARQ process ID is used in either case of skipping and failure, the network should rely on, e.g., DTX or energy detection, to distinguish skipping and failure. Depending on the energy detection performance, the network may determine retransmission even though the UE skips UL transmission or determine no retransmission even though the UE actually transmits in uplink. It would require complicated false scheduling handling from the UE side. Therefore, a new mechanism is required to help the network correctly distinguish skipping and failure other than, e.g., energy detection.

Figure 8:
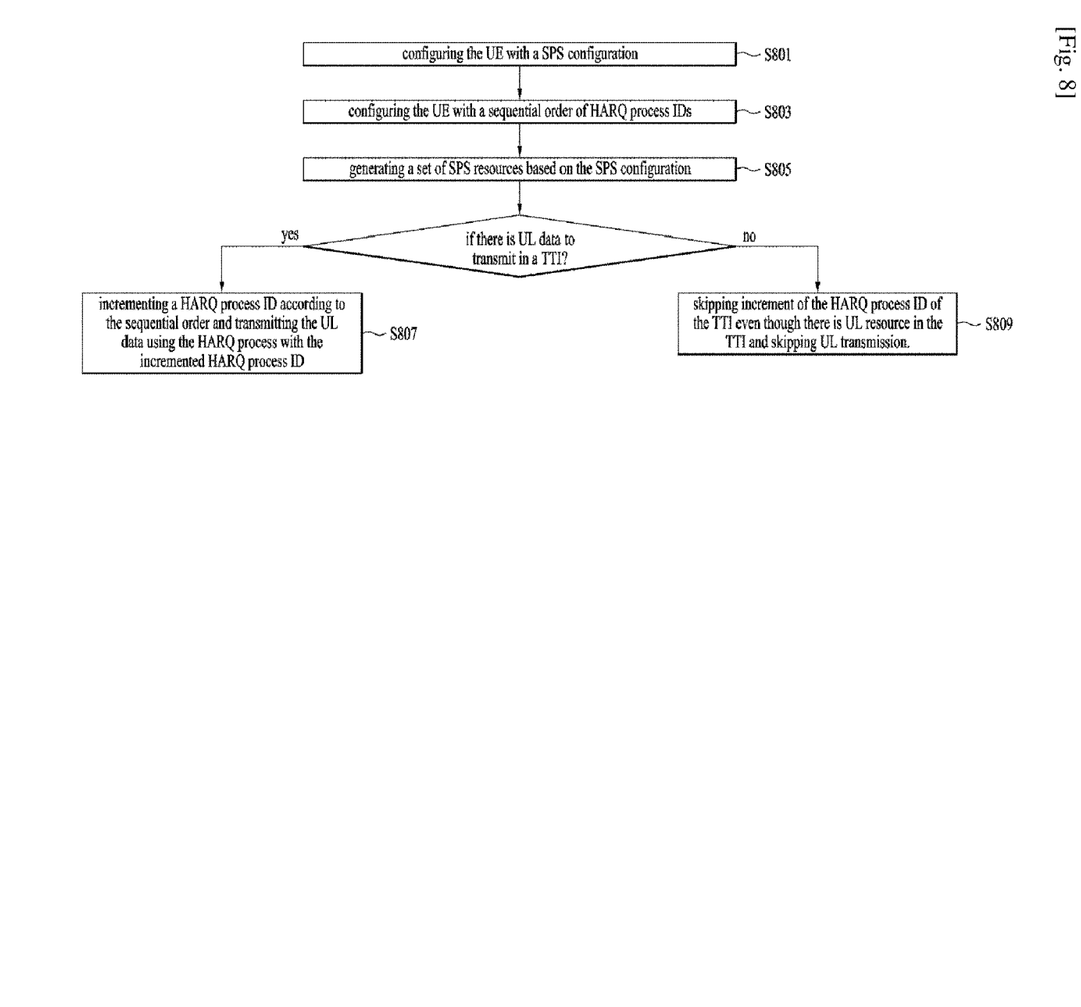
FIG. 8 is a conceptual diagram for handling of HARQ process IDs with uplink skipping by a user equipment in wireless communication system according to embodiments of the present invention.

FIG. 8 is a conceptual diagram for handling of HARQ process IDs with uplink skipping by a user equipment in wireless communication system according to embodiments of the present invention.

This embodiment describes from a user equipment perspective.

In this invention, a UE increments a HARQ process ID associated with a TTI according to the sequential order of HARQ process ID number only if the UE actually transmits an UL data in the TTI by using UL resource. In other words, the UE skips increment of the HARQ process ID of the TTI even though there is UL resource in the TTI if the UE doesn't transmit an UL data in the TTI.

The UE is configured with a SPS configuration from a network (S801). The SPS configuration includes SPS resource, periodicity, skipULTx, etc.

In LTE, the skipULTx indicates that the UE skips UL transmission on a TTI when the UE has an UL resource for this TTI but the UE has no UL data to be transmitted in this TTI. The UE is configured with skipULTxSPS when SPS interval is shorter than 10 subframes in order to avoid unnecessary padding transmission.

In NR, skipping configured grant (i.e. SPS grant) in mandated in NR regardless of CG periodicity. Otherwise, skipping dynamic UL grant is configurable.

Preferably, the UL data is a MAC PDU including at least one MAC SDU.

The UE is configured with a sequential order of HARQ process IDs from the network (S803).

Preferably, the UE receives a HARQ process ID set including a plurality of HARQ process IDs from a network. And the plurality of HARQ process IDs are listed in a sequential order in the HARQ process ID set.

Preferably, the sequential order indicates the sequence of the HARQ process ID number that will be used for each UL transmission. And the HARQ process ID wraps around upon reaching a certain value which is a number of the plurality of HARQ process IDs in the HARQ process ID set, when the UE uses a HARQ process ID based on the sequential order in the received HARQ process ID set.

For example, if the sequential order is defined as [0, 1, 3, 2], the UE uses HARQ processes with the ID [0, 1, 3, 2, 0, 1, 3, 2 . . . ] for each UL transmission.

Preferably, the UE can receives the sequential order in the HARQ process ID set and the HARQ process ID set from the network, separately.

The UE generates a set of SPS resources based on the SPS configuration. The SPS resources are spanned in a time domain with periodicity (S805). If SPS resource is configured on a TTI, the UE can transmit UL data on that TTI using the SPS resource.

On a TTI configured with SPS resource, if there is UL data to transmit in the TTI, the UE increments the HARQ process ID according to the sequential order and transmits the UL data using the HARQ process with the incremented HARQ process ID (S807).

For example, if the sequential order is [0, 1, 3, 2] and the last HARQ process ID used for UL data transmission was 1, the UE uses HARQ process ID #3 for UL data transmission in the TTI. The UE transmits the HARQ process ID that is used for UL transmission together with the UL data.

The HARQ process ID is included in uplink control information (UCI) on PUCCH or PUSCH resource, when the associated UL data is transmitted on the PUSCH.

On a TTI configured with SPS resource, if there is no UL data to transmit in the TTI, the UE skips increment of the HARQ process ID of the TTI even though there is UL resource in the TTI and does not perform UL transmission (S809).

As shown in FIG. 6, the UE (1100 or 1200) may comprises processor (1111 or 1211), Memory (1112 or 1212) and RF module (transceiver; 1113 or 1213). The processor (1111 or 1211) is electrically connected with the transceiver (1113 or 1213) and controls it.

Specifically, FIG. 6 may represent a UE comprising a processor (1111 or 1211) operably coupled with a memory (1112 or 1212) and configured to receive a HARQ process ID set including a plurality of HARQ process IDs from a network, receive a set of uplink resources from the network, transmit a first data on a first uplink resource with a first HARQ process ID among the plurality of HARQ process IDs, skip one or more transmissions on one or more uplink resources after the first uplink resource, transmit a second data on a second uplink resource with a second HARQ process ID among the plurality of HARQ process IDs, when the one or more transmissions on the one or more uplink resources are skipped.

The proposed method is implemented by may be implemented by a processing chip. In case of a system on chip (SoC), the processing chip may include the processor 1111 or 1211 and the memory 1112 or 1212, and may be mounted on, installed on, or connected to the communication device 1100 or 1200.

The processing chip may be configured to receive a HARQ process ID set including a plurality of HARQ process IDs from a network, receive a set of uplink resources from the network, transmit a first data on a first uplink resource with a first HARQ process ID among the plurality of HARQ process IDs, skip one or more transmissions on one or more uplink resources after the first uplink resource, transmit a second data on a second uplink resource with a second HARQ process ID among the plurality of HARQ process IDs, when the one or more transmissions on the one or more uplink resources are skipped via the transceiver 1113 or 1213 operably connected or coupled to the processing chip.

The memory 1112 or 1212 in the processing chip may be configured to store software codes including instructions that, when executed by the processor, causes the processor to perform some or all of functions, methods or processes discussed in the present disclosure.

Figure 9:
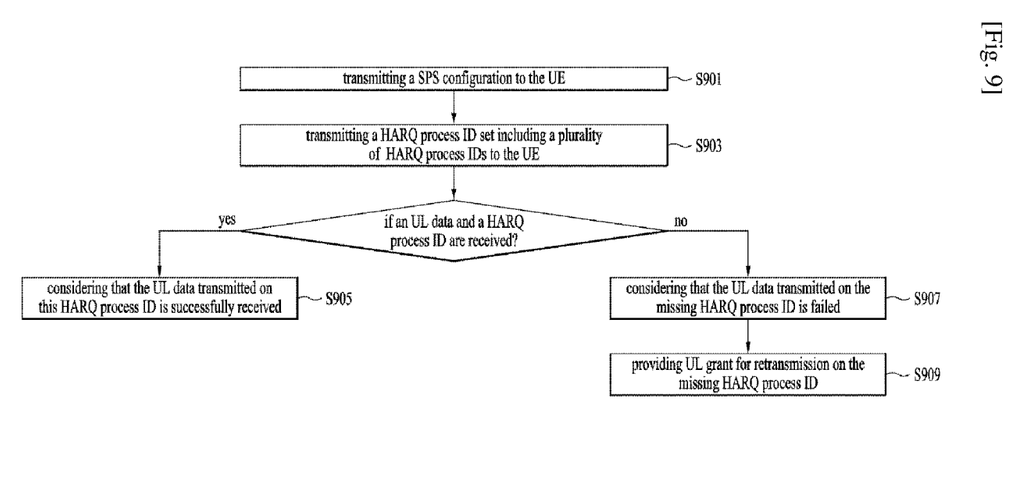
FIG. 9 is a conceptual diagram for handling of HARQ process IDs with uplink skipping by a network in wireless communication system according to embodiments of the present invention.

FIG. 9 is a conceptual diagram for handling of HARQ process IDs with uplink skipping by a network in wireless communication system according to embodiments of the present invention.

This embodiment describes from a base station perspective.

The network transmits a SPS configuration to the UE (S901). The SPS configuration includes SPS resource, periodicity, skipULTx, etc.

In LTE, the skipULTx indicates that the UE skips UL transmission on a TTI when the UE has an UL resource for this TTI but the UE has no UL data to be transmitted in this TTI. The UE is configured with skipULTxSPS when SPS interval is shorter than 10 subframes in order to avoid unnecessary padding transmission.

In NR, skipping configured grant (i.e. SPS grant) in mandated in NR regardless of CG periodicity. Otherwise, skipping dynamic UL grant is configurable.

The network transmits a HARQ process ID set including a plurality of HARQ process IDs to the UE (S903). And the plurality of HARQ process IDs are listed in a sequential order in the HARQ process ID set.

Preferably, the sequential order indicates the sequence of the HARQ process ID number that will be used for each UL transmission. And the HARQ process ID wraps around upon reaching a certain value which is a number of the plurality of HARQ process IDs in the HARQ process ID set when the UE uses a HARQ process ID based on the sequential order in the received HARQ process ID set.

Preferably, the network transmits the sequential order in the HARQ process ID set and the HARQ process ID set from the network, separately.

If the network receives an UL data and a HARQ process ID, the network considers that the UL data transmitted on this HARQ process ID is successfully received (S905).

If the network detects a missing HARQ process ID, the network considers that the UL data transmitted on the missing HARQ process ID is failed (S907).

When the network receives a new data with a HARQ process ID which is the very next ID of a HARQ process ID of the last successful UL transmission based on the sequence order, even though there is UL resource in a previous TTI, the network considers that there is no missing HARQ process ID because the UE skips UL data in the previous TTI.

Otherwise, the network considers a HARQ process ID missing when a HARQ process ID received together with the current UL data is not in sequence compared to the last HARQ process ID received together with the last UL data.

For example, assuming that the sequence order is defined as [0, 1, 3, 2], if a HARQ process ID #3 is received together with the current UL data and the last HARQ process ID is #0, the network considers that HARQ process ID #1 missing. So, in this case, the network may provide UL grant for retransmission on HARQ process ID #1.

And then, the network provides UL grant for retransmission on the missing HARQ process ID (S909).

*124The proposed method is implemented by a network apparatus, shown in FIG. 6, but it can be any apparatus for performing the same operation.

As shown in FIG. 6, the network apparatus may comprises a processor (1111 or 1211), Memory (1112 or 1212), and RF module (transceiver; 1113 or 1213). The processor (1113 or 1213) is electrically connected with the transceiver (1113 or 1213) and controls it.

Specifically, FIG. 6 may represent a network apparatus comprising a processor (1111 or 1211) operably coupled with the RF module (transceiver; 1113 or 1213) and configured to transmit a SPS configuration to the UE, transmit a HARQ process ID set including a plurality of HARQ process IDs to the UE. And when the network receives an UL data with a HARQ process ID, the network considers that the UL data transmitted on this HARQ process ID is successfully received. Otherwise, when the network detects a missing HARQ process ID, the network considers that the UL data transmitted on the missing HARQ process ID is failed.

Figure 10:
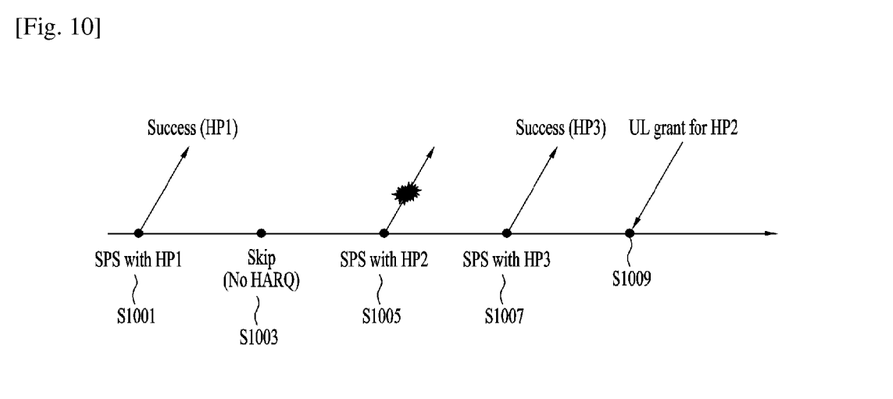
FIG. 10 is an example for handling of HARQ process IDs with uplink skipping in wireless communication system according to embodiments of the present invention.

FIG. 10 is an example for handling of HARQ process IDs with uplink skipping in wireless communication system according to embodiments of the present invention.

It is assumed that a UE is configured with a sequential order for HARQ process ID is defined as [1, 2, 3, 4].

The UE is configured with SPS configuration and generates SPS resource according to the received SPS configuration, as shown FIG. 10.

On the 1st SPS, the UE increments the HARQ process ID to #1, and the UE transmits an UL data on the HARQ process ID #1. When transmitting the UL data, the UE transmits the HARQ process ID #1 together with the UL data. The network receives the UL data and knows that the UL data is successfully transmitted by using the HARQ process ID #1 (S1001).

On the 2nd SPS, the UE skips an UL data, and thus, the UE does not increment the HARQ process ID (S1003).

On the 3rd SPS, the UE increments the HARQ process ID to #2, and the UE transmits an UL data on the HARQ process ID #2. When transmitting the UL data, the UE transmits the HARQ process ID #2 together with the UL data. The network does not successfully receive the UL data. The network also does not receive any HARQ process ID at this point in time (S1005).

On the 4th SPS, the UE increments the HARQ process ID to #3, and the UE transmits an UL data on the HARQ process ID #3. When transmitting the UL data, the UE transmits the HARQ process ID #3 together with the UL data. The network receives the UL data and knows that the UL data is successfully transmitted by using the HARQ process ID #3. In this step, the network detects missing HARQ process ID #2 because the last HARQ process ID is #1 and the current HARQ process ID is #3. Therefore, the network considers that the UL transmission on HARQ process ID #2 is failed (S1007).

The network may provide UL grant for retransmission on HARQ process ID #2 (S1009).

The aforementioned implementations are achieved by combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the implementations of the present disclosure. The order of operations described in the implementations of the present disclosure may be changed. Some structural elements or features of one implementation may be included in another implementation, or may be replaced with corresponding structural elements or features of another implementation. Moreover, it is apparent that some claims referring to specific claims may be combined with another claims referring to the other claims other than the specific claims to constitute the implementation or add new claims by amendment after the application is filed.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors, etc.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE and NR system, the present invention is applicable to a variety of wireless communication systems in addition to the 3GPP LTE and NR system.

The invention claimed is:

1. A method for a communication device operating in a wireless communication system, the method comprising:
   receiving a Hybrid-ARQ (HARQ) process Identifier (ID) set including a plurality of HARQ process IDs from a network, wherein the plurality of HARQ process IDs are listed in a sequential order in the HARQ process ID set;
   receiving a set of uplink resources from the network;
   transmitting a first data on a first uplink resource with a first HARQ process ID among the plurality of HARQ process IDs;
   determining to skip one or more transmissions on one or more uplink resources after the first uplink resource;
   transmitting a second data on a second uplink resource with a second HARQ process ID among the plurality of HARQ process IDs, after the one or more transmissions on the one or more uplink resources are skipped, wherein the second HARQ process ID is a very next ID of the first HARQ process ID according to the sequential order in the HARQ process ID set, wherein the communication device uses a HARQ process ID based on the sequential order in the received HARQ process ID set, when the communication device actually transmits an UL data in a uplink resource associated with the HARQ process ID, and wherein the HARQ process ID wraps around upon reaching a certain value which is a number of the plurality of HARQ process IDs in the HARQ process ID set when the communication device uses the HARQ process ID based on the sequential order in the received HARQ process ID set.

2. The method according to claim 1, further comprising:
   receiving the sequential order in the HARQ process ID set from the network.

3. A communication device for operating in a wireless communication system, the communication device comprising:
a memory; and
a processor operably coupled with the memory and configured to:
receive a Hybrid-ARQ (HARQ) process Identifier (ID) set including a plurality of HARQ process IDs from a network, wherein the plurality of HARQ process IDs are listed in a sequential order in the HARQ process ID set;
receive a set of uplink resources from the network;
transmit a first data on a first uplink resource with a first HARQ process ID among the plurality of HARQ process IDs;
determine to skip one or more transmissions on one or more uplink resources after the first uplink resource;
transmit a second data on a second uplink resource with a second HARQ process ID among the plurality of HARQ process IDs, after the one or more transmissions on the one or more uplink resources are skipped, wherein the second HARQ process ID is a very next ID of the first HARQ process ID according to the sequential order in the HARQ process ID set, wherein the communication device uses a HARQ process ID based on the sequential order in the received HARQ process ID set, when the communication device actually transmits an UL data in a uplink resource associated with the HARQ process ID, and wherein the HARQ process ID wraps around upon reaching a certain value which is a number of the plurality of HARQ process IDs in the HARQ process ID set when the communication device uses the HARQ process ID based on the sequential order in the received HARQ process ID set.

4. The communication device according to claim 3, wherein the processor is further configured to receive the sequential order in the HARQ process ID set from the network.

5. The communication device according to claim 3, wherein the communication device is capable of communicating with at least one of another device, a device related to an autonomous driving vehicle, a base station or a network.

* * * * *